(12) United States Patent
Minagawa et al.

(10) Patent No.: US 6,472,845 B2
(45) Date of Patent: Oct. 29, 2002

(54) MOTOR/GENERATOR DEVICE

(75) Inventors: Yuusuke Minagawa; Hisayuki Furuse; Minoru Arimitsu; Shoichi Maeda, all of Yokosuka; Masaki Nakano, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/899,920

(22) Filed: Jul. 9, 2001

(65) Prior Publication Data
US 2002/0033689 A1 Mar. 21, 2002

(30) Foreign Application Priority Data
Aug. 7, 2000 (JP) ........................................ 2000-238078

(51) Int. Cl.[7] ................................................. H02P 5/34
(52) U.S. Cl. ..................... 318/801; 318/148; 318/153; 318/730; 310/112; 310/113; 310/114
(58) Field of Search ................................ 318/730, 801, 318/802, 148, 151, 152, 153; 310/112, 113, 114

(56) References Cited

U.S. PATENT DOCUMENTS

| | | | | |
|---|---|---|---|---|
| 4,375,047 A | * | 2/1983 | Nelson et al. | 318/48 |
| 4,532,447 A | * | 7/1985 | Cibie | 310/114 |
| 6,049,152 A | | 4/2000 | Nakano et al. | 310/114 |
| 6,211,597 B1 | * | 4/2001 | Nakano | 310/266 |
| 6,335,606 B1 | * | 1/2002 | Minagawa et al. | 318/801 |
| 6,376,955 B1 | * | 4/2002 | Arimitsu | 310/114 |
| 6,384,567 B1 | * | 5/2002 | Maeda | 318/801 |

FOREIGN PATENT DOCUMENTS

JP          11-275826          10/1999

* cited by examiner

Primary Examiner—Robert E. Nappi
Assistant Examiner—Rina I. Duda
(74) Attorney, Agent, or Firm—Foley & Lardner

(57) ABSTRACT

An inverter (23) generates a composite current comprising an electrical current for a first rotor (4) and an electrical current for a second rotor (3). A microprocessor (22) controls the inverter (23) so that the average value of the composite current is smaller than the sum of the average values of the respective currents.

21 Claims, 7 Drawing Sheets

MOTOR/GENERATOR DEVICE

FIELD OF THE INVENTION

This invention relates to a motor/generator provided with a plurality of rotors.

BACKGROUND OF THE INVENTION

Tokkai-Hei-11-275826 published by the Japanese Patent Office in 1999 and U.S. Pat. No. 6,049,152 disclose a motor/generator which controls a plurality of rotors independently with a single inverter. The inverter supplies a composite current comprising control currents corresponding to the respective rotational phases of each rotor to a single stator or a plurality of stators.

SUMMARY OF THE INVENTION

It is an object of this invention to reduce switching loss resulting from the generation of a composite current by an inverter in the above type of motor/generator.

In order to achieve the above object, this invention provides a motor/generator device comprising a stator, a first rotor associated with the stator, a second rotor associated with the stator, an inverter connected to the stator, and a microprocessor programmed to control the inverter to cause a composite electrical current of a first electrical current associated with a rotation of the first rotor and a second electrical current associated with a rotation of the second rotor, to flow between the inverter and the stator. The composite electrical current has a composite waveform combining a waveform of the first electrical current and a waveform of the second electrical current while an average value of the composite electrical current is smaller than the sum of an average value of the first electrical current and an average value of the second electrical current.

The details as well as other features and advantages of this invention are set forth in the remainder of the specification and are shown in the accompanying drawings.

DESCRIPTION OF THE PREFERRED EMBODIMENTS

Figure 1:
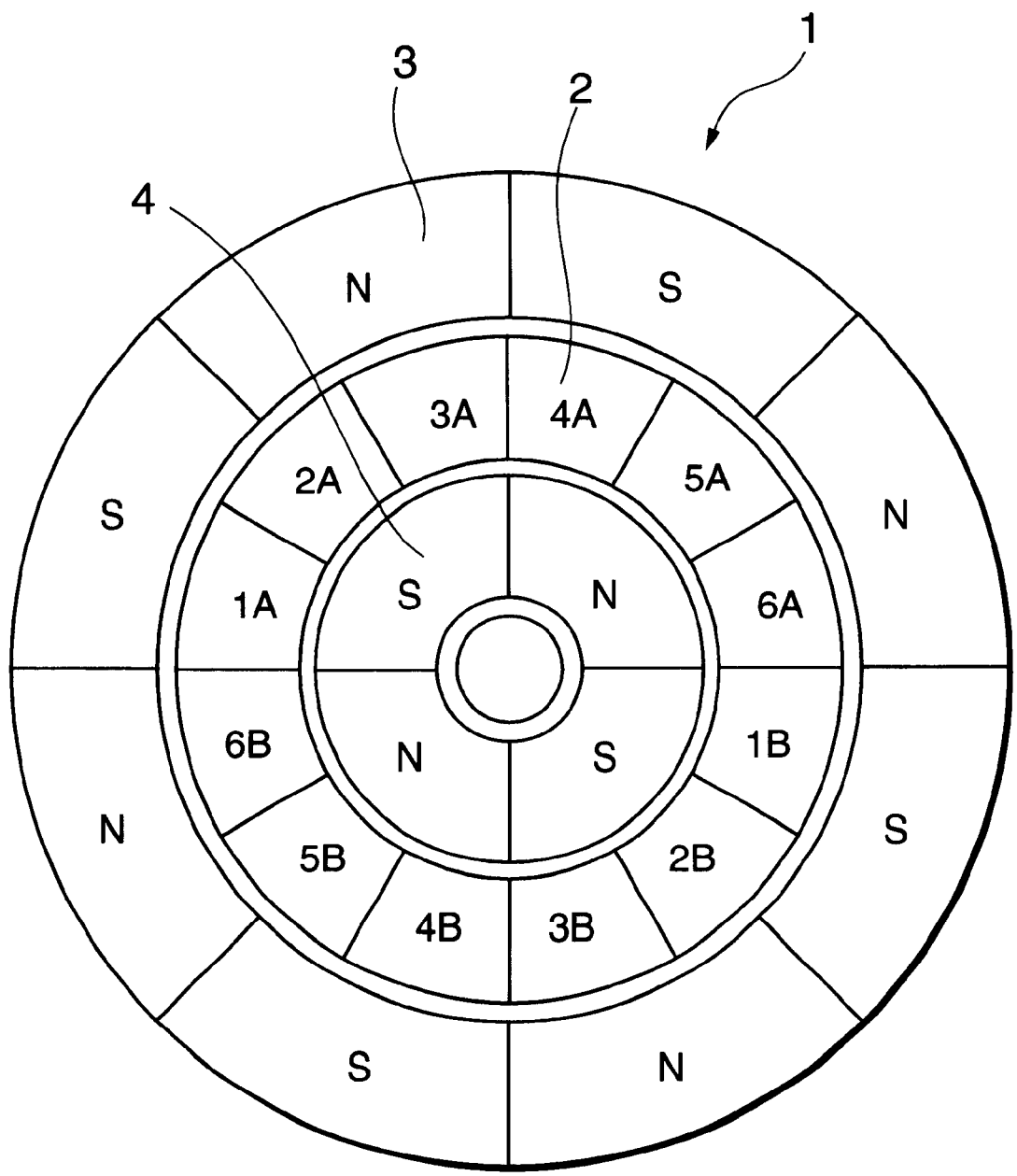
FIG. 1 is a schematic cross-sectional view of a motor/generator according to this invention.

Referring to FIG. 1 of the drawings, a composite motor/generator for driving a vehicle is provided with a cylindrical stator 2, an outer rotor 3 disposed in a fixed gap on an outer side of the stator 2 and an inner rotor 4 disposed in a fixed gap on an inner side of the stator 2.

Figure 2:
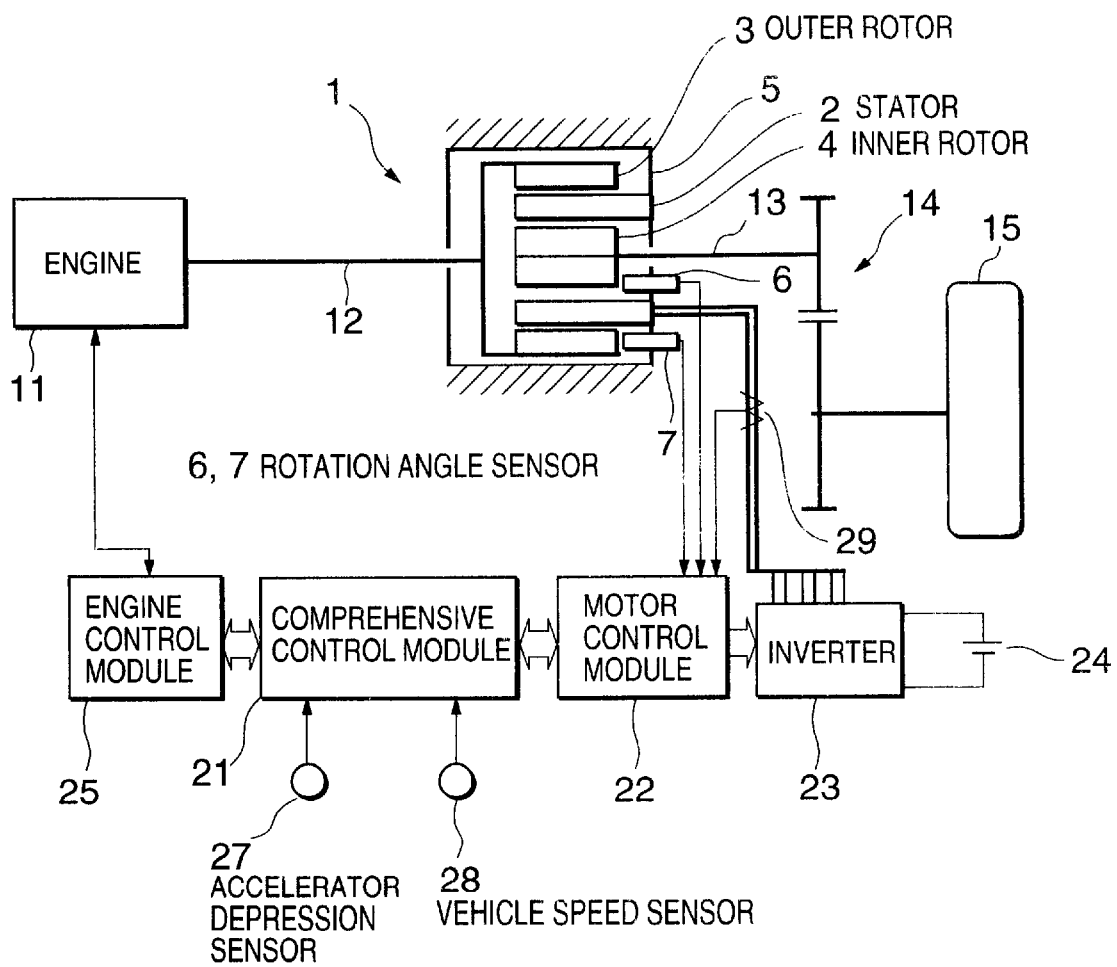
FIG. 2 is a schematic diagram of a controller for the motor/generator according to this invention.

Inside an outer frame 5, the stator 2 and the rotors 3 and 4 are disposed coaxial to and can rotate about a drive shaft 13 which is shown in FIG. 2.

Referring again to FIG. 1, the inner rotor 4 comprises four magnets in which the N pole and the S pole alternate every 90 degrees. The outer rotor 3 comprises eight magnets in which the N pole and the S pole alternate every 45 degrees.

Although the same type of magnet is used in the inner rotor 3 and the outer rotor 4, since the number of magnets used in the outer rotor 3 is higher, the magnetomotive force per unit angle in the outer rotor 3 is greater than that in the inner rotor 4.

The stator 2 is provided with three coils for each magnetic pole of the inner rotor 4, that is to say, a total of twelve coils. The coils are provided at equal angular intervals on the same circular periphery.

There is a distinction herein between the coil numbers 1A–6A and 1B–6B of the twelve coils. The coils 1A and 1B, 2A and 2B, 3A and 3B, 4A and 4B, 5A and 5B, 6A and 6B are disposed in symmetrical positions about the drive shaft 13 as center.

A six-phase alternating current is supplied to the twelve coils in order to generate a rotating magnetic field with respect to the inner rotor 4. The phase of this current deviates by 60 degrees at each of the twelve coils. The six-phase currents are designated as Ii(0), Ii(60), Ii(120), Ii(180), Ii(240), and Ii(300). A three-phase alternating current is supplied to the twelve coils in order to generate a rotating magnetic field with respect to the outer rotor 3. The phase of this current deviates by 120 degrees at each of the twelve coils. The three-phase currents are designated as Io(0), Io(120), and Io(240).

Since a rotating magnetic field is simultaneously generated with respect to both the outer rotor 3 and the inner rotor 4, a composite current comprising the six-phase current and the three-phase current is supplied to each coil. As a result, the currents $I_{1A}$–$I_{6A}$ supplied to the coils 1A–6A and the currents $I_{1B}$–$I_{6B}$ supplied to the coils 1B–6B may be represented as follows.

$I_{1A} = Ii(0) + Io(0)$ $I_{2A} = Ii(60) + o(120)$ $I_{3A} = i(120) + o(240)$ $I_{4A} = i(180) + o(0)$ $I_{5A} = i(240) + o(120)$ $I_{6A} = i(300) + o(240)$ $I_{1B} = i(0) + o(0)$ $I_{2B} = i(60) + o(120)$ $I_{3B} = i(120) + o(240)$ $I_{4B} = i(180) + o(0)$ $I_{5B} = i(240) + o(120)$ $I_{6B} = i(300) + o(240)$

As shown clearly in the above equations, the current $I_{1A}$ supplied to the coil 1A is the same as the current $I_{1B}$ supplied to the coil 1B. That is to say, $I_{1A} = I_{1B}$. In the same manner, $I_{2A} = I_{2B}$, $I_{3A} = I_{3B}$, $I_{4A} = I_{4B}$, $I_{5A} = I_{5B}$, $I_{6A} = I_{6B}$.

The currents Ii(0)–Ii(300) are synchronized with the rotational phase of the inner rotor 4 and the currents Io(0)–Io(240) are synchronized with the rotational phase of the outer rotor 3. Furthermore, although advance or delay in the current phase is set with respect to torque, the setting is the same as that in a normal synchronous motor.

Figure 3:
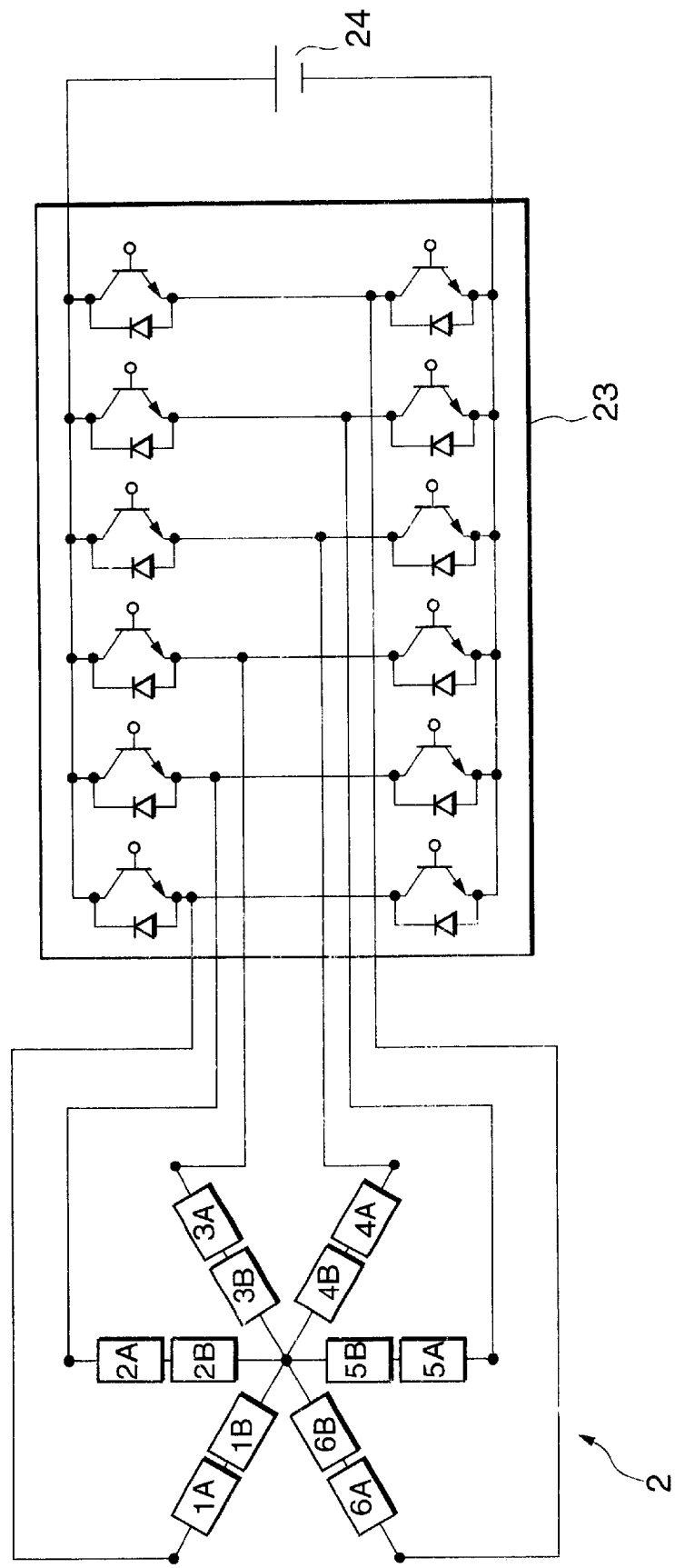
FIG. 3 is a circuit diagram of stator coils and an inverter according to this invention.

Referring now to FIG. 3, the same current flows in coils 1A and 1B and these coils are connected in series. In the same manner, the coils 2A and 2B, 3A and 3B, 4A and 4B, 5A and 5B, 6A and 6B are connected respectively in series.

Since the control device for the composite motor/generator 1 supplies a composite current to the twelve coils 1A to 6A and 1B to 6B, an inverter 23 is provided in order to convert the direct current from the battery 24 to an alternating current.

The inverter 23 is a normal three-phase bridge type inverter which has been converted to six phases and comprises twelve transistors and twelve diodes.

Referring now to FIG. 2, the control device comprises a comprehensive control module 21, a motor control module 22 and an engine control module 25.

The respective control modules 21, 22, 25 comprise microcomputers which are provided with a central processing unit (CPU), a read only memory (ROM), a random access memory (RAM) and an input/output interface (I/O interface).

The control device is provided with a rotational angle sensor 6 which detects the rotational angle of the outer rotor 3, a rotational angle sensor 7 which detects the rotational angle of the inner rotor 4 and a plurality of current sensors 29 which detect the current applied from the inverter 23 to a plurality of coils in the stator 2. Signals from the rotational angle sensors 6 and 7 and the current sensor 29 are input to the motor control module 22.

The motor control module 22 supplies a pulse width modulation (PWM) signal to each gate of the inverter 23, that is to say, to the base of each transistor based on a target torque of the outer rotor 3 and the inner rotor 4 which is determined by the comprehensive control module 21. As a result, a direct current from the battery 24 is converted by the inverter 23 into the six types of alternating current described above.

Figure 4:
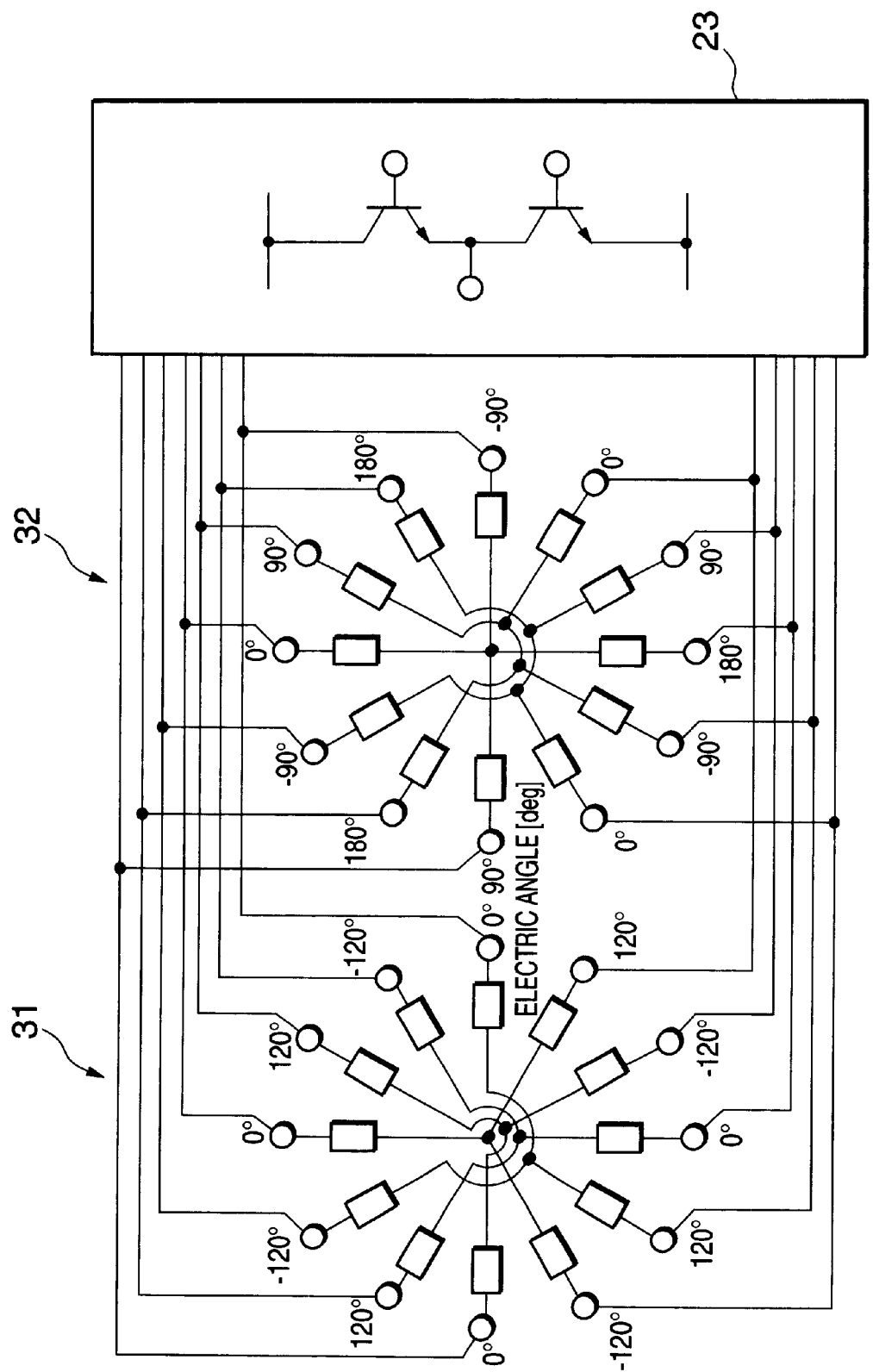
FIG. 4 is a circuit diagram of stator coils and an inverter when this invention is applied to two independent motor/generators.

In this embodiment, two rotors 3, 4 are driven by a common stator 2. However as shown in FIG. 4, this invention may be applied to two independent motor/generators 31 and 32. FIG. 4 shows the situation in which a rotor of the motor/generator 31 has eight magnetic poles, a rotor of the motor/generator 32 has six magnetic poles and the stators of both the motor/generators 31, 32 have respectively twelve coils.

Referring again to FIG. 2, the composite motor 1 is integrated with the vehicle engine 11. The output shaft 12 of the engine 11 is connected with the outer rotor 3 and the inner rotor 4 is connected to a drive shaft 13. The drive shaft 13 is connected to a vehicle drive shaft 15 through a reduction gear 14. Hereafter, the combination of the first rotor 4 and the stator 2 will be referred to as a first motor/generator, and that of the second rotor 4 and the stator 2 will be referred to as a second motor/generator.

The reason why the reduction gear 14 is only connected to the first motor/generator is in order to create a difference in the rotation speed performance range of the two motor/generators. As a result, the rotation speed performance range of the first motor/generator is set to be higher than the rotation speed performance range of the second motor/generator.

When the first motor/generator is driven as a motor and the second motor/generator is driven as a generator, the overall power consumption in the battery 24 corresponds to the difference of the power consumed by the first motor/generator and the power generated by the second motor/generator.

An accelerator pedal depression amount APS from an accelerator depression sensor 27 which detects a depression amount APS of an accelerator pedal with which the vehicle is provided and a vehicle speed VSP from a vehicle speed sensor 28 which detects a vehicle running speed are input into the comprehensive control module 21.

Figure 5:
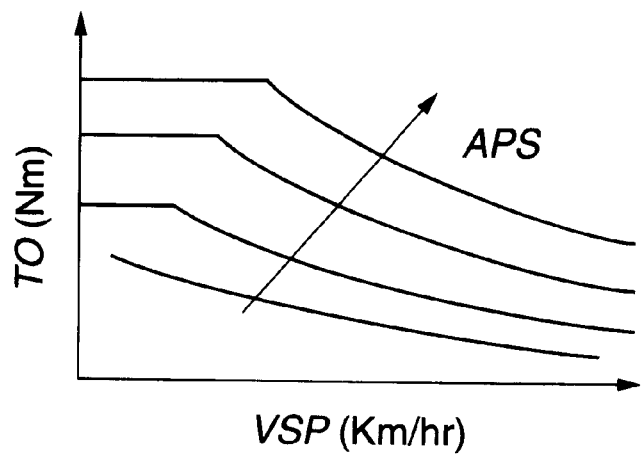
FIG. 5 is a diagram showing the contents of a map of target drive torque TO stored in a comprehensive control module according to this invention.
Figure 6:
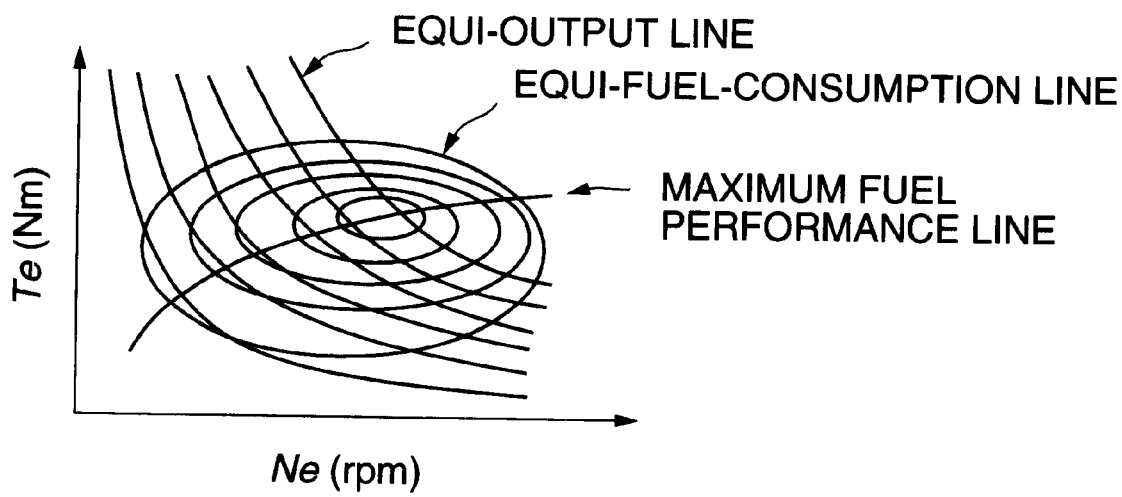
FIG. 6 is a diagram showing the contents of a map of target engine torque Te and target engine rotation speed Ne stored in the comprehensive control module.

The comprehensive control module 21 looks up a prestored map shown in FIG. 5 based on the accelerator pedal depression amount APS and the vehicle speed VSP in order to calculate a target drive torque TO for the vehicle. The comprehensive control module 21 also looks up a prestored map shown in FIG. 6 and calculates a target engine rotation speed Ne and a target engine torque Te such that the engine attains an output power approximately equal to a product of the target drive torque TO and the vehicle speed VSP, i.e., a vehicle output power, at a maximum fuel consumption efficiency.

The target engine rotation speed Ne is equal to the target rotation speed Ng of the second motor/generator which connects the outer rotor 3 to the output shaft 12 of the engine 11 In the same manner, the target engine torque Te is equal to the target torque Tg of the second motor/generator.

The output power of the second motor/generator 32 is approximately equal to the output power of the engine 11. The target torque Tm of the first motor/generator is equal to the target drive torque TO.

The comprehensive control module 21 inputs the target torque Tm of the first motor/generator, and the target rotation speed Ng and the target torque Tg of the second motor/generator thus determined into the motor control module 22. The motor control module 22 performs control of the motor as described below based on this data.

The motor control module 22 determines a command value with respect to the d axis current and the q axis current for each motor/generator using known current vector control and outputs it to the inverter 23.

On the other hand, the motor control module 22 calculates a real d axis current and q axis current from the signals output from the outer rotor rotation angle sensor 7, the inner rotor rotation angle sensor 6 and the plurality of current sensors 29. A correction amount is calculated in order to make the actual d axis current and the actual q axis current coincide with the command value for each motor/generator. The correction amount for the first motor/generator is converted from two-phase to six-phase coordinates in order to calculate a voltage command for the six-phase alternating current. The correction amount for the second motor/generator is converted from two-phase to three-phase coordinates in order to calculate a voltage command for the three-phase alternating current.

The voltage commands for each motor/generator are then summed in order to calculate a composite voltage command. The motor control module 22 then outputs a PWM signal which is generated from the composite voltage command and a carrier signal to the inverter 23.

Herein, the size of the current vector determined by current vector control of each motor/generator corresponds to the size of the current peak of the control current for each motor/generator described later.

The engine control module 25 controls a fuel injection amount, an ignition timing and an air intake amount of the engine 11 so that the rotation speed and the torque of the engine 11 respectively coincide with the target rotation speed Ne and the target engine target Te.

The reduction in the average value of the current due to a composite current which is controlled by the motor control module 22 will now be described.

The control current I1(t) of the first motor/generator is calculated from Equation (1).

$$I1(t) = Im \cdot \sin(\omega 1 \cdot t) \tag{1}$$

where,

Im=current peak, and

ω=angular speed of inner rotor 4.

The control current I2(t) of the second motor/generator 32 is calculated from Equation (2).

$$I2(t) = Ig \cdot \sin\{2 \cdot (\omega 2 \cdot t + \theta a)\} \tag{2}$$

where,

Ig=current peak,

ω2=angular speed of inner rotor 4, and

θa=phase difference of the outer rotor 3 and the inner rotor 4.

The control current for the three-phase alternating current is expressed differently for each phase. Herein the three-phase current supplied to the first motor/generator is expressed by Equation (1) and the three-phase current supplied to the second motor/generator is respectively expressed by Equation (2).

An average current Ia is obtained by substituting the control currents I1(t) and I2(t) in the following Equation (3).

$$Ia = \frac{2}{T} \int_{-\frac{1}{\omega}}^{-\frac{1}{\omega} + \frac{T}{2}} I(t) \cdot dt \tag{3}$$

The average value $Ia_m$ of the control current I1(t) is expressed by Equation (4).

$$Ia_m = 2 \cdot Im/\pi \tag{4}$$

The average value $Ia_g$ of the control current I2(t) is expressed by Equation (5).

$$Ia_g = 2 \cdot Ig/\pi \tag{5}$$

The composite current Ic(t) is expressed by Equation (6).

$$Ic(t) = I1(t) + I2(t) = Im \cdot \sin(\omega 1 \cdot t) + Ig \cdot \sin\{2 \cdot (\omega 2 \cdot t + \theta a)\} \tag{6}$$

When this value is substituted into Equation (3), the average value Iac of the composite current Ic(t) is calculated from Equation (7).

$$Iac = \frac{\sum_{\theta a=0}^{2\pi} \left[ \frac{\sum_{\omega_1=0}^{2\pi} Im \cdot \sin(\omega_1 \cdot t) + \sum_{\omega_2=0}^{2\pi} Ig \cdot \sin\{2 \cdot (\omega_2 \cdot t + \theta a)\}}{2 \cdot \pi} \right]}{2 \cdot \pi} \tag{7}$$

Figure 7:
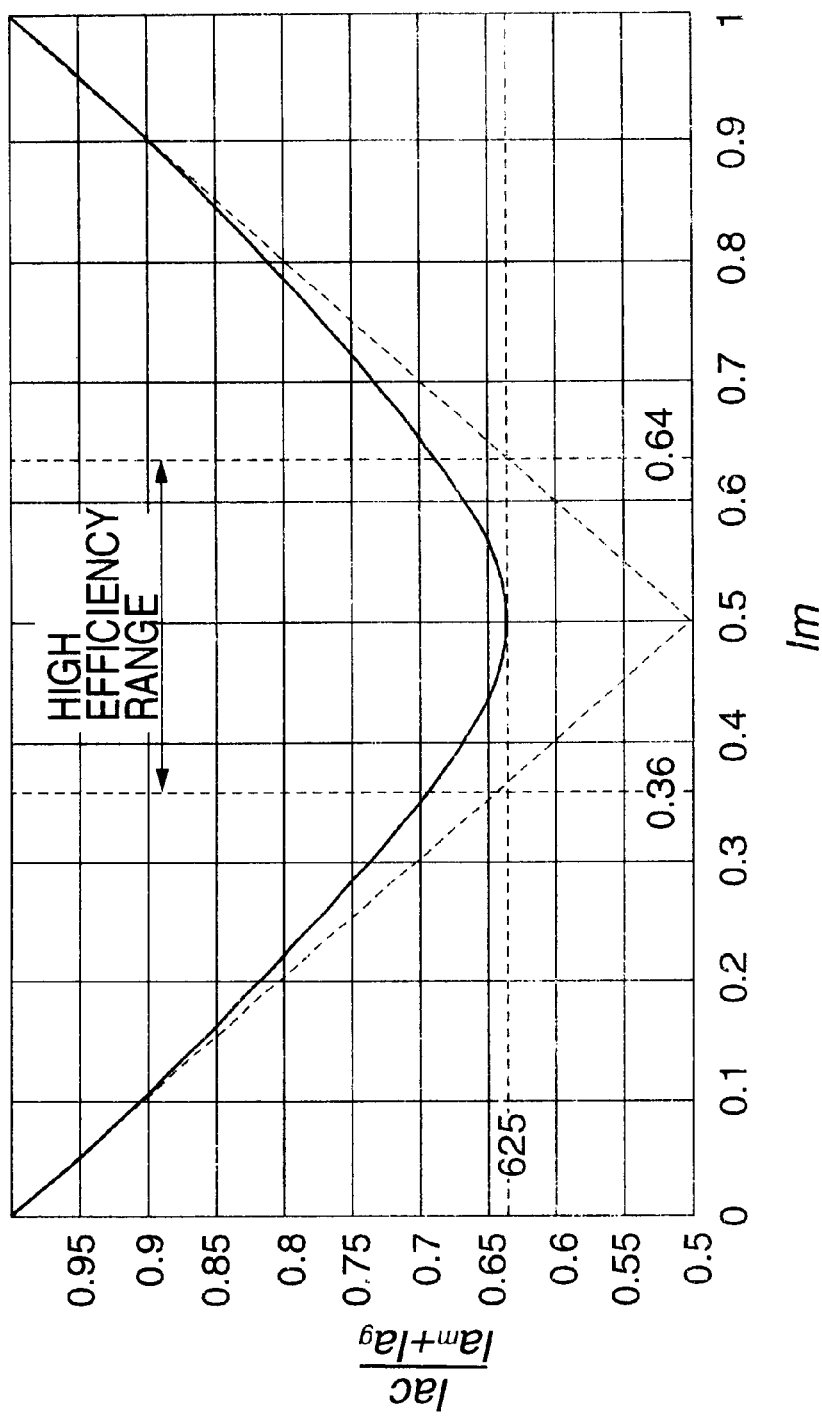
FIG. 7 is a diagram describing the relationship of a current peak and a reduction rate of average current of each control current when the sum of the current peaks of two types of control current has a value of one.

When the reduction rate $$\frac{Iac}{Ia_m + Ia_g}$$

of the average value of the current resulting from the composite current is calculated from Equation (4), Equation (5) and Equation (7), characteristics are obtained as shown in FIG. 7.

Figure 8:
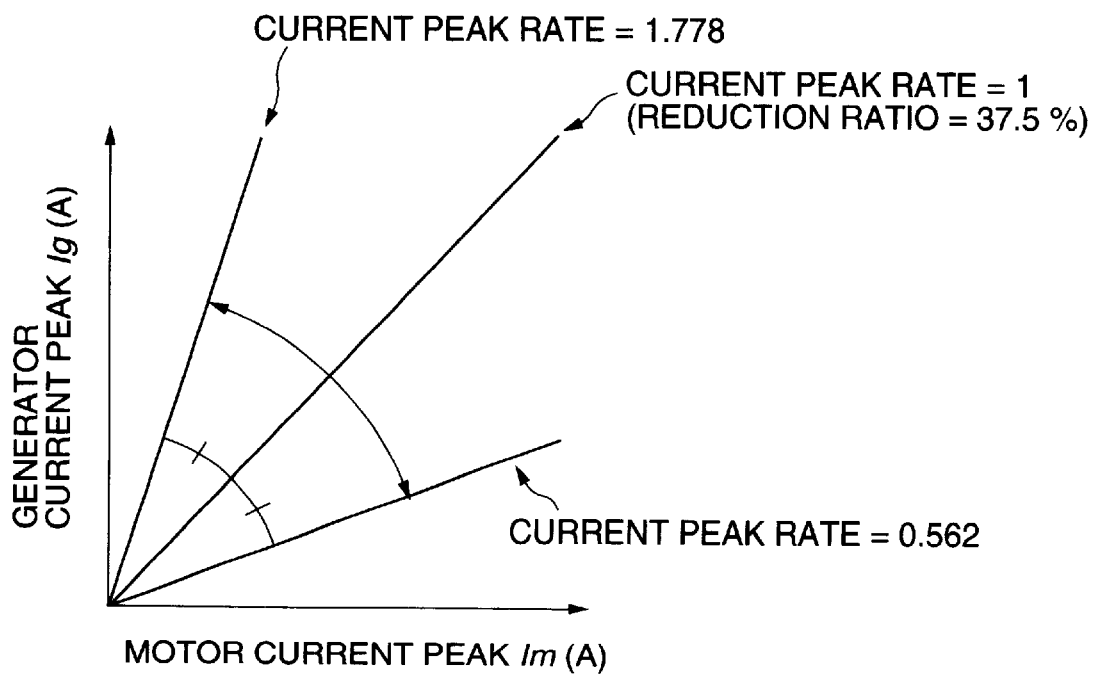
FIG. 8 is a diagram describing the relationship of the current peak of a motor and the current peak of a generator.

The relationship of the current peak Im and the reduction rate $$\frac{Iac}{Ia_m + Ia_g}$$

of the current average value, when Im+Ig=1, are shown in FIG. 8.

The current values shown by FIG. 7 and FIG. 8 are represented as a ratio to the case in which the peak value is 1.0.

As shown in the figures, the average value of the composite current when the current peaks of the two control currents is equal is a minimum value of 62.5% (reduction rate 37.5%). A range of high efficiency exists when the rate $$\frac{Ig}{Im}$$

of the two current peaks has a value of 1.0. That is to say, it exists in a fixed region centering on Im=Ig. From FIG. 7, the range applies to values of the current peak rate $$\frac{Ig}{Im}$$

from $$\frac{0.36}{1 - 0.36} = 0.562$$

to $$\frac{0.64}{1 - 0.64} = 1.778.$$

This relationship is shown in FIG. 8.

The motor control module 22 controls the inverter 23 so that the current peak Im of the control current I1 of the first motor/generator and the current peak Ig of the control current I2 of the second motor/generator falls between a line defined by a current peak rate=0.562 and a line defined by a current peak rate=1.778 as shown in FIG. 8.

It is preferred that the current peak rate $$\frac{Ig}{Im}$$

is positioned on the line of maximum efficiency when vehicle drive output is at a maximum, that is to say, when the current peak values Im and Ig both take maximum values. It is further preferred that the rotation speed performance region of the inner rotor 4 and the outer rotor 3 is set so that the small radius inner rotor 4 which has a small magnetic magnetomotive force is rotated at a higher speed than the large radius output rotor 3 which has a large magnetomotive force. The current peak rate approaches a value of one when the two motor/generators are operated at equal outputs.

The above setting allows highly efficient operation of the motor/generators by reducing switching loss resulting from the generation of a composite current by the inverter 23.

The contents of Tokugan 2000–238078, with a filing date of Aug. 7, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A motor/generator device comprising:
   a stator;
   a first rotor associated with the stator;
   a second rotor associated with the stator;
   an inverter connected to the stator; and
   a microprocessor programmed to control the inverter to cause a composite electrical current of a first electrical current associated with a rotation of the first rotor and a second electrical current associated with a rotation of the second rotor, to flow between the inverter and the stator, wherein the composite electrical current has a composite waveform combining a waveform of the first electrical current and a waveform of the second electrical current while an average value of the composite electrical current is smaller than the sum of an average value of the first electrical current and an average value of the second electrical current.

2. The motor/generator device as defined in claim 1, wherein the stator comprises a plurality of coils each of which is connected to the inverter.

3. The motor/generator device as defined in claim 1, wherein a ratio of a current peak of the first electrical current and a current peak of the second electrical current is set within a range from 0.562 to 1.778.

4. The motor/generator device as defined in claim 3, wherein the current peak of the first electrical current is equal to the current peak of the second electrical current.

5. The motor/generator device as defined in claim 1, wherein the second electrical current takes a maximum value when the first electrical current takes a maximum value.

6. The motor/generator device as defined in claim 1, wherein the first rotor in connected to the drive wheels of a vehicle, the second rotor is connected to an engine mounted in the vehicle, the first rotor functions as a motor, and the second rotor functions as a generator which generates an electrical current required by the motor.

7. The motor/generator device as defined in claim 1, wherein the first rotor has a smaller radius than the second rotor, and a rotation speed performance range of the first rotor is set to be higher than a rotation speed performance range of the second rotor.

8. The motor/generator device as defined in claim 7, wherein the second rotor is provided with a larger magnetomotive force than the first rotor.

9. The motor/generator device as defined in claim 2, wherein a ratio of a current peak of the first electrical current and a current peak of the second electrical current is set within a range from 0.562 to 1.778.

10. The motor/generator device as defined in claim 2, wherein the second electrical current takes a maximum value when the first electrical current takes a maximum value.

11. The motor/generator device as defined in claim 3, wherein the second electrical current takes a maximum value when the first electrical current takes a maximum value.

12. The motor/generator device as defined in claim 4, wherein the second electrical current takes a maximum value when the first electrical current takes a maximum value.

13. The motor/generator device as defined in claim 2, wherein the first rotor is connected to the drive wheels of a vehicle, the second rotor is connected to an engine mounted in the vehicle, the first rotor functions as a motor, and the second rotor functions as a generator which generates an electrical current required by the motor.

14. The motor/generator device as defined in claim 3, wherein the first rotor is connected to the drive wheels of a vehicle, the second rotor is connected to an engine mounted in the vehicle, the first rotor functions as a motor, and the second rotor functions as a generator which generates an electrical current required by the motor.

15. The motor/generator device as defined in claim 4, wherein the first rotor is connected to the drive wheels of a vehicle, the second rotor is connected to an engine mounted in the vehicle, the first rotor functions as a motor, and the second rotor functions as a generator which generates an electrical current required by the motor.

16. The motor/generator device as defined in claim 5, wherein the first rotor is connected to the drive wheels of a vehicle, the second rotor is connected to an engine mounted in the vehicle, the first rotor functions as a motor, and the second rotor functions as generator which generates an electrical current required by the motor.

17. The motor/generator device as defined in claim 2, wherein the first rotor has a smaller radius than the second rotor, and a rotation speed performance range of the first rotor is set to be higher than a rotation speed performance range of the second rotor.

18. The motor/generator device as defined in claim 3, wherein the first rotor has a smaller radius the second rotor, and a rotation speed performance range of the first rotor is set to be higher than a rotation speed performance range of the second rotor.

19. The motor/generator device as defined in claim 4, wherein the first rotor has a smaller radius that the second rotor, and a rotation speed performance range of the first rotor is set to be higher than a rotation speed performance range of the second rotor.

20. The motor/generator device as defined in claim 5, wherein the first rotor has a smaller radius than the second rotor, and a rotation speed performance range of the first rotor is set to be higher than a rotation speed performance range of the second rotor.

21. The motor/generator device as defined in claim 6, wherein the first rotor has a smaller radius that the second rotor, and a rotation speed performance range of the first rotor is set to be higher than a rotation speed performance range of the second rotor.

* * * * *